US008953288B2

United States Patent
Jankowski et al.

(10) Patent No.: US 8,953,288 B2
(45) Date of Patent: Feb. 10, 2015

(54) SENTINEL UNIT FOR AN IT ELECTRICAL DISTRIBUTION SYSTEM HAVING A FLOATING REFERENCE CONDUCTOR

(75) Inventors: David Paul Jankowski, Manoona (AU); Geoffrey Rubython, Mayfield (AU); Wayne Callen, Redhead (AU); Walter Henry Berryman, Inverloch (AU)

(73) Assignee: IEP2 Research Pty Limited (AU)

( * ) Notice: Subject to any disclaimer, the term of this patent is extended or adjusted under 35 U.S.C. 154(b) by 781 days.

(21) Appl. No.: 13/140,755

(22) PCT Filed: Dec. 21, 2009
(Under 37 CFR 1.47)

(86) PCT No.: PCT/AU2009/001678
§ 371 (c)(1),
(2), (4) Date: May 21, 2012

(87) PCT Pub. No.: WO2010/069011
PCT Pub. Date: Jun. 24, 2010

(65) Prior Publication Data
US 2012/0262830 A1 Oct. 18, 2012

(30) Foreign Application Priority Data

Dec. 19, 2008 (AU) .............................. 2008906556
Dec. 22, 2008 (AU) .............................. 2008906566

(51) Int. Cl.
*H02H 9/02* (2006.01)
*H02H 3/32* (2006.01)
(52) U.S. Cl.
CPC .. *H02H 9/02* (2013.01); *H02H 3/32* (2013.01)
USPC .......................................................... 361/42
(58) Field of Classification Search
CPC ......... H02H 1/0015; H02H 3/32; H02H 3/33; H02H 3/338; H02H 3/335; H02H 9/02; H01H 83/04

USPC .................................................. 361/42, 93.9
See application file for complete search history.

(56) References Cited

U.S. PATENT DOCUMENTS 5,475,327 A  12/1995  Wu et al.
5,510,945 A  4/1996  Taylor et al.
(Continued)

FOREIGN PATENT DOCUMENTS

CN        1716723       1/2006
CN      201066780       5/2008
(Continued)

OTHER PUBLICATIONS

Earthing system retrieved from the internet http://en.wikipedia.org/w/index.php?title=Earthing_system&oldid=257429804, Published on Dec. 12, 2008 as per History page on Wikipedia 8 Pages.
International Search Report for PCT/AU2009/001678, Completed by the Australian Patent Office on Mar. 2, 2010, 3 Pages.
(Continued)

*Primary Examiner* — Jared Fureman
*Assistant Examiner* — Kevin J Comber
(74) *Attorney, Agent, or Firm* — Brooks Kushman PC

(57) ABSTRACT

A protection system for an IT electrical distribution system (EDS) has a floating reference conductor and two electrical conductors in the form of an active conductor and a neutral conductor. System includes two input terminals for electrically connecting to an MEN electrical power source that is upstream of system. Two output terminals are electrically connected to an electrical load in the form of an electrical motor for a compressor of an upright freezer display. A motor protection device, in the form of an MCB, electrically connects terminals to allow a supply of electrical power to a motor. The MCB is responsive to a fault signal at a port for selectively electrically disconnecting at least one of the terminals. A sentinel unit selectively generates the fault signal at port in response to the current in conductor being greater than a predetermined threshold.

17 Claims, 4 Drawing Sheets

(56) References Cited

U.S. PATENT DOCUMENTS

| | | | |
|---|---|---|---|
| 6,437,951 B1 | 8/2002 | Ahlstrom et al. | |
| 6,667,866 B1* | 12/2003 | LaPlace et al. | 361/87 |
| 7,808,774 B2* | 10/2010 | Tay et al. | 361/600 |
| 2005/0207075 A1* | 9/2005 | Callen et al. | 361/42 |
| 2006/0133001 A1 | 6/2006 | Van Den Berg et al. | |

FOREIGN PATENT DOCUMENTS

| | | |
|---|---|---|
| GB | 2004144 A | 3/1979 |
| WO | 9926328 A1 | 5/1999 |
| WO | 2008153579 A1 | 12/2008 |

OTHER PUBLICATIONS http://shop.pulset.com/catalogue/c8/c360/p932, Retrieved Jul. 26, 2011, 2 Pages.

http://shop.pulset.com/catalogue/c8/c360/p933, Retrieved Jul. 27, 2011, 2 Pages.

Chinese Office Action for CN 200980157234.4, English translation attached to original, Dated Dec. 2, 2013, All together 16 Pages.

Yang et al. Building Electricity 2002, vol. 1, English translation attached to original, All together 16 Pages. "Design and Discussion of Operating Room Power Distribution and Insulation Monitoring System."

* cited by examiner

| SPECIFICATION | RCD (Prior Art) | Embodiment | GFCI (Prior Art) |
| --- | --- | --- | --- |
| Isolation speed ms | 10-40 Avg | 5 constant | 25 Avg |
| Isolation milliamps | 10-30 Avg | 5 constant | 5 |
| Fault type detection | Current to earth | Voltage to frame | Current to ground |
| Operating voltage range | 192-264 | 88-264 | 88-121 |
| Operating temperature | -10 - +47º | -10 - +77º | -10 - +47º |
| Maximum circuit load | 63A | 63A | 63A |
| Internal circuit isolation | 6ka | 6ka | 6ka |
| Self testing | No | Yes | No |
| Input voltage detection | 240 | 110 / 240 | 110 |
| Frequency | 50Hz | 50/400Hz | 60Hz |

Figure 4

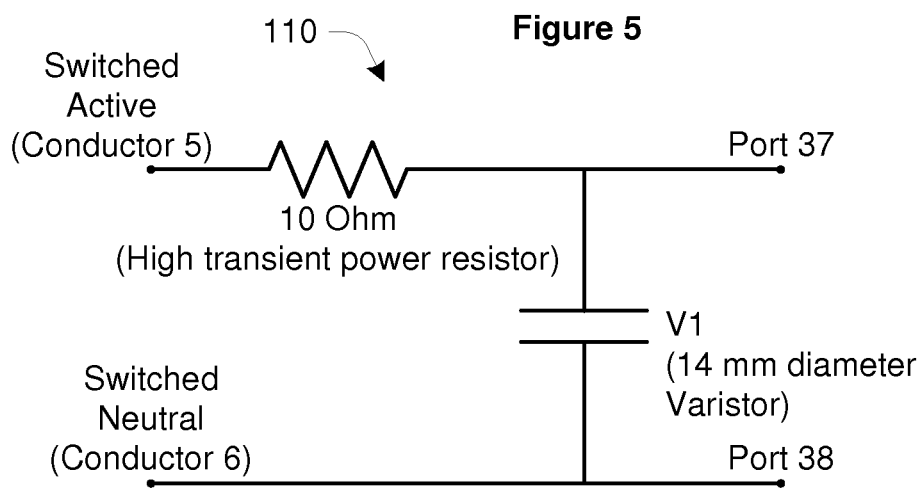

Figure 5

A sentinel unit for an IT electrical distribution system having a floating reference conductor

SENTINEL UNIT FOR AN IT ELECTRICAL DISTRIBUTION SYSTEM HAVING A FLOATING REFERENCE CONDUCTOR

CROSS-REFERENCE TO RELATED APPLICATION

This application is the U.S. national phase of PCT Appln. No. PCT/AU2009/001678 filed Dec. 21, 2009 which claims priority to Australian application 2008906556 filed Dec. 19, 2008, and Australian application 2008906566 filed Dec. 22, 2008, the disclosures of which are incorporated in their entirety by reference herein.

FIELD OF THE INVENTION

The present invention relates to a sentinel unit and in particular to a sentinel unit for an IT electrical distribution system having a floating reference conductor.

Embodiments of the invention have been developed particularly for mains voltage deployments, and will be described herein with reference to that application. It will be appreciated, however, that the invention is not limited to such a field of use, and is applicable in broader contexts. Examples of these other deployments and applications of the invention are found in an Australian patent application in the name of the present applicant and filed with IP Australia on 19 Dec. 2008 (U.S. patent application Ser. No. 13/140,756). The subject matter of that earlier application, in its entirety, is incorporated herein by way of cross-reference.

BACKGROUND

Any discussion of the background art throughout the specification should in no way be considered as an admission that such art is widely known or forms part of common general knowledge in the field.

Known protection devices have been primarily developed for TN electrical distribution systems and require a well-established and common earth connection to function correctly and safely. Most commercially available protection devices are not suitable for use in an IT electrical distribution system.

Protection devices that are available for use in an IT electrical distribution system are often complex and expensive to implement, and are only economic for use in high-end deployments.

SUMMARY OF THE INVENTION

It is an object of the present invention to overcome or ameliorate at least one of the disadvantages of the prior art, or to provide a useful alternative.

According to a first aspect of the invention there is provided a sentinel unit for an IT electrical distribution system having a floating reference conductor and at least two electrical conductors for supplying electrical power from a source, via an electrical protection device, to a load, wherein: the protection device is responsive to a fault signal for electrically isolating the load from the source; and the sentinel unit selectively generates the fault signal in response to the current in the reference conductor being greater than a predetermined current threshold.

In one embodiment, the predetermined current threshold is less than about 10 mA.

In one embodiment, the predetermined current threshold is less than about 5 mA.

In one embodiment, the sentinel unit includes a limiting circuit for limiting the current in the reference conductor.

In one embodiment, the limiting circuit limits the current in the reference conductor to no more than the predetermined current threshold.

In one embodiment, the sentinel unit selectively generates the fault signal in response to the current in the reference conductor being greater than the predetermined current threshold and the voltage in the reference conductor being greater than a predetermined voltage threshold.

In one embodiment, the predetermined voltage threshold is less than about 40 Volts.

In one embodiment, the predetermined voltage threshold is less than about 35 Volts.

In one embodiment, the predetermined voltage threshold is less than about 30 Volts.

In one embodiment, the predetermined voltage threshold is less than a touch potential.

According to a second aspect of the invention there is provided a sentinel unit for an IT electrical distribution system having a floating reference conductor and at least two electrical conductors for supplying electrical power from a source to a load, wherein the sentinel unit limits the current flowing in the reference conductor to less than a first predetermined current threshold.

In one embodiment, the IT electrical distribution system supplies electrical power from the source, via an electrical protection device, to the load, and the protection device is responsive to a fault signal for electrically isolating the load from the source.

In one embodiment, the sentinel unit selectively generates the fault signal in response to the current in the reference conductor being greater than a second predetermined current threshold.

In one embodiment, the first predetermined current threshold and the second predetermined current threshold are different.

In one embodiment, the first and second predetermined current thresholds are less than about 35 mA.

In one embodiment, the first and second predetermined current thresholds are less than about 20 mA.

In one embodiment, the first and second predetermined current thresholds are less than about 10 mA.

In one embodiment, the first and second predetermined current thresholds are about 10 mA and 8 mA respectively.

In one embodiment, the first and second predetermined current thresholds are about 8 mA and 5 mA respectively.

In one embodiment, the sentinel unit limits the current flowing in the reference conductor to less than a first predetermined current threshold after the generation of the fault signal.

According to a third aspect of the invention there is provided a sentinel unit for an IT electrical distribution system having a floating reference conductor and at least two electrical conductors for supplying electrical power from a source to a load, wherein the sentinel unit provides a variable impedance to shape a current flowing in the reference conductor.

In one embodiment, the variable impedance substantially maintains a peak value of the current while reducing the average value of the current.

According to a fourth aspect of the invention there is provided a sentinel unit for an IT electrical distribution system having a floating reference conductor and at least two electrical conductors for supplying electrical power from a source to a load, wherein the sentinel unit includes:

a monitoring circuit for selectively generating a fault signal in response to a fault condition in the electrical distribution system; and policing circuit that is responsive to one or more characteristics of the monitoring circuit for selectively generating the fault signal.

In one embodiment, a failure of the policing circuit to correctly selectively generate the fault signal does not prevent the monitoring circuit from generating the fault signal.

In one embodiment, the monitoring circuit detects the fault condition from one or more characteristics of: the current flowing in the floating reference conductor; and/or the voltage of the floating reference conductor relative to one or more of the electrical conductors.

In one embodiment, the electrical power is provided as an AC voltage waveform having alternate positive half-cycles and negative half-cycles, and the monitoring circuit includes two sub-circuits that are substantively responsive to the fault condition in the positive and negative half-cycles respectively.

In one embodiment, the electrical power is provided as an AC voltage waveform having alternate positive half-cycles and negative half-cycles, and the policing circuit includes two sub-circuits that are one or more characteristics of the monitoring circuit for selectively generating the fault signal in the positive and negative half-cycles respectively.

In one embodiment, the monitoring unit limits the current in the reference conductor.

In one embodiment, the monitoring unit limits the current in the reference conductor to a predetermined peak current value.

In one embodiment, the monitoring unit shapes the current in the reference conductor such that the average current is less than that of a sine wave current having the predetermined peak value.

According to a fifth aspect of the invention there is provided a method for monitoring an IT electrical distribution system having a floating reference conductor and at least two electrical conductors for supplying electrical power from a source, via an electrical protection device, to a load, wherein: the protection device is responsive to a fault signal for electrically isolating the load from the source; and the method includes the step of selectively generating the fault signal in response to the current in the reference conductor being greater than a predetermined current threshold.

According to a sixth aspect of the invention there is provided a method for monitoring an IT electrical distribution system having a floating reference conductor and at least two electrical conductors for supplying electrical power from a source to a load, wherein the method includes the step of limiting the current flowing in the reference conductor to less than a first predetermined current threshold.

According to a seventh aspect of the invention there is provided a method for monitoring an IT electrical distribution system having a floating reference conductor and at least two electrical conductors for supplying electrical power from a source to a load, wherein the method includes the step of providing a variable impedance to shape a current flowing in the reference conductor.

According to an eighth aspect of the invention there is provided a method for monitoring an IT electrical distribution system having a floating reference conductor and at least two electrical conductors for supplying electrical power from a source to a load, wherein the method includes the steps of:

providing a monitoring circuit for selectively generating a fault signal in response to a fault condition in the electrical distribution system; and being responsive to one or more characteristics of the monitoring circuit for selectively generating the fault signal.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Preferred embodiments of the invention will now be described, by way of example only, with reference to the accompanying drawings in which:

FIG. 4 is a comparison table of characteristics of an embodiment of the invention and two prior art devices; and FIG. 5 is a schematic representation of a high voltage protection circuit for use with the sentinel unit of FIG. 2.

DETAILED DESCRIPTION

Figure 1:
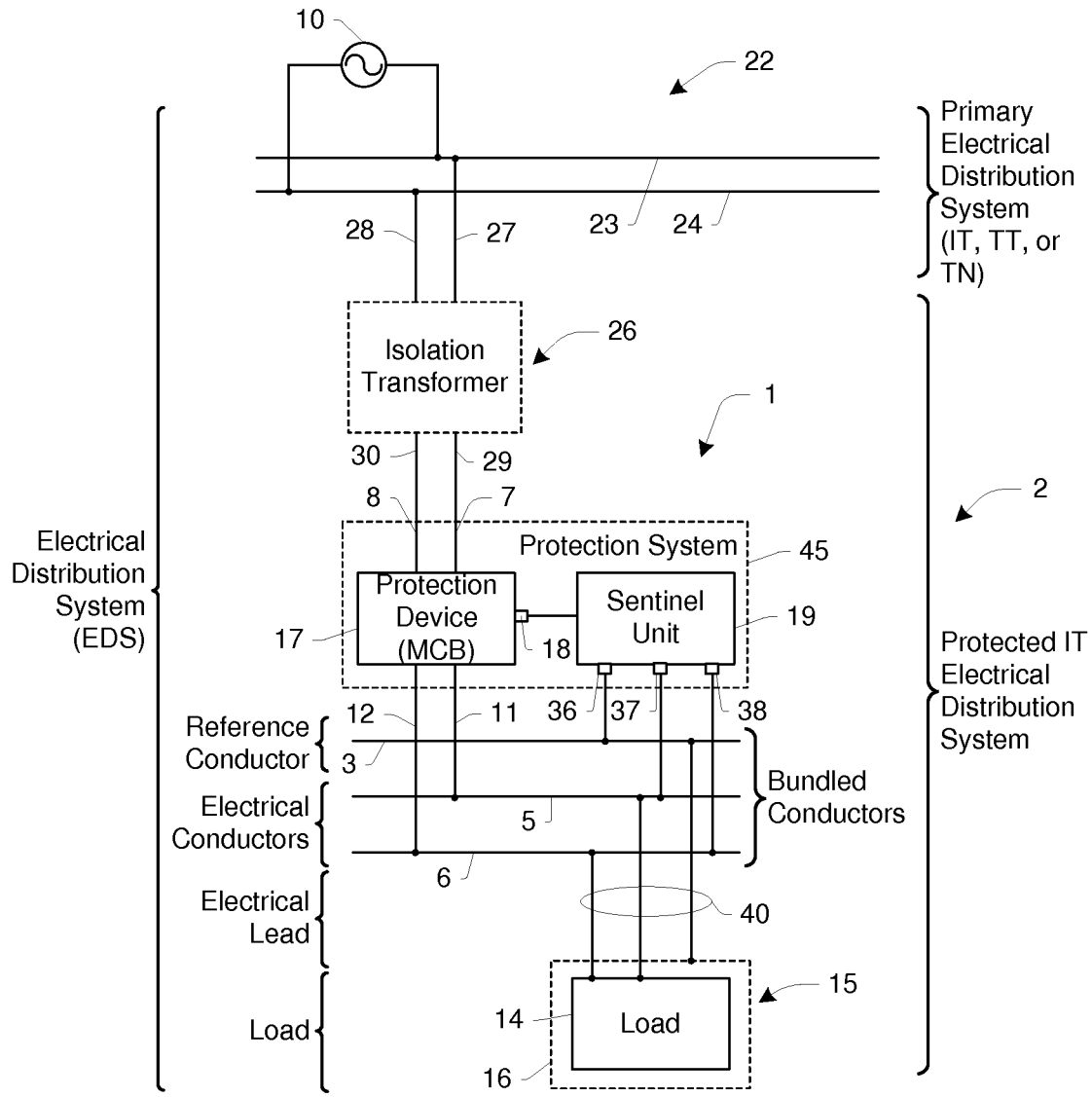
FIG. 1 is a schematic representation of a protection system according to an embodiment of the invention.

Referring to FIG. 1 there is illustrated a protection system 1 for an IT electrical distribution system (EDS) 2. EDS 2 has a floating reference conductor 3 and two electrical conductors in the form of an active conductor 5 and a neutral conductor 6. System 1 includes two input terminals 7 and 8 for electrically connecting to an MEN electrical power source 10 that is upstream of system 1. Two output terminals 11 and 12 are electrically connected, via respective conductors 5 and 6, to an electrical load in the form of an electrical motor 14 for a compressor (not shown) of an upright freezer display 15 having a metal cabinet 16. It will be appreciated that motor 14 is downstream of the system 1. A protection device, in the form of an MCB 17, electrically connects terminals 7 and 8 to respective terminals 11 and 12 to allow a supply of electrical power from source 10 to motor 14. MCB 17 is responsive to a fault signal at a port 18 for selectively electrically disconnecting at least one of terminals 7 and 8 from the respective output terminals 11 and 12 to prevent the supply of electrical power. A sentinel unit 19 selectively generates the fault signal at port 18 in response to the current in conductor 3 being greater than a predetermined current threshold.

A more detailed description of system 1 is provided in an Australian patent application in the name of the present applicant and filed with IP Australia on 19 Dec. 2008 (U.S. patent application Ser. No. 13/140,756). The subject matter of that earlier application, in its entirety, is incorporated herein by way of cross-reference.

Figure 2:
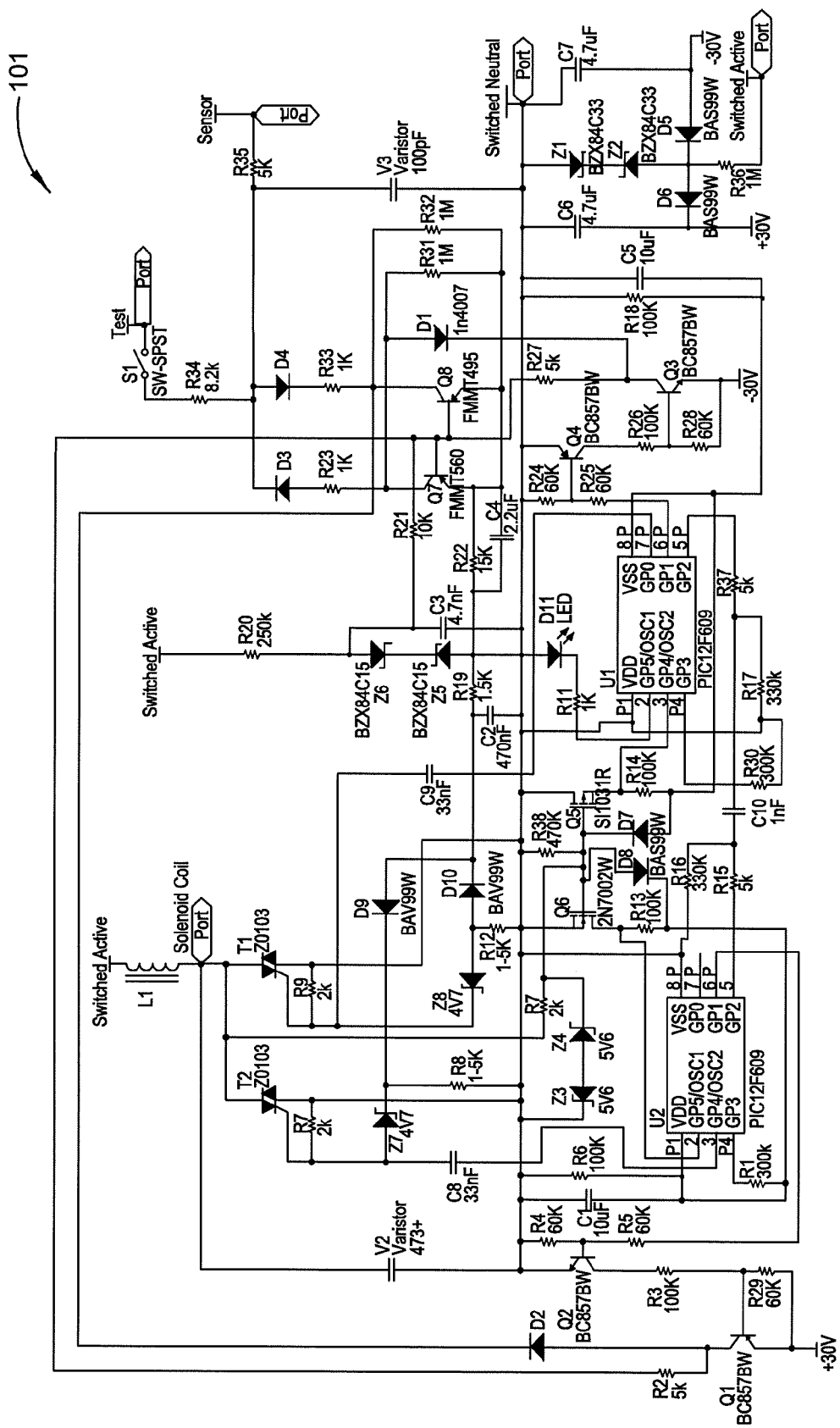
FIG. 2 is a detailed schematic representation of the electronic components within a sentinel unit of one of the preferred embodiments of the invention.

Reference is now made to FIG. 2 where there is illustrated a schematic representation of a circuit 101 of a sentinel unit of an embodiment of the invention. The Figure shows the specific nature and arrangement of electronic components within circuit 101. The actual components used in the illustrated configuration are set out in the tables below, and are identified by the reference indicia used in FIG. 2.

Printed Resistors

| # | Value | Tol | Ink | Comments |
|---|---|---|---|---|
| R1 | 300k | Wide | 100k | |
| R2 | 5k | 2% | 10k | Match with R21 |
| R3 | 100k | 20% | 100k | |
| R4 | 60k | 20% | 100k | |
| R5 | 60k | 20% | 100k | |
| R6 | 100k | 20% | 100k | |
| R7 | 2k | 2% | 1k | |
| R8 | 1k-5k | | 1k | Active trim |
| R9 | 2k | 2% | 1k | |
| R10 | 1Meg | 20% | 100k | |
| R11 | 1k | 5% | 1k | |
| R12 | 1k-5k | | 1k | Active trim |
| R13 | 100k | 5% | 100k | |
| R14 | 100k | 5% | 100k | |
| R15 | 5k | 2% | 10k | Match with R37 |
| R16 | 330k | 2% | 10k | |
| R17 | 330k | 2% | 10k | |
| R18 | 100k | 20% | 100k | |
| R19 | 1.5k | 1% | 1k | |
| R20 | 250k | 20% | 100k | |
| R21 | 10k | 2% | 10k | Match with R2, R27 |
| R22 | 15k | 2% | 10k | |
| R23 | 1k | 20% | 1k | |
| R24 | 60k | 20% | 100k | |
| R25 | 60k | 20% | 100k | |
| R26 | 100k | 20% | 100k | |
| R27 | 5k | 2% | 10k | Match with R21 |
| R28 | 60k | 20% | 100k | |
| R29 | 60k | 20% | 100k | |
| R30 | 300k | Wide | 100k | |
| R31 | 1Meg | 20% | 100k | |
| R32 | 1Meg | 20% | 100k | |
| R33 | 1k | 20% | 1k | |
| R35 | 5k | 20% | 1k | |
| R36 | 1Meg | 20% | 100k | |
| R37 | 5k | 2% | 10k | Match with R15 |
| R38 | 470k | 20% | 100k | |

Semiconductors and Diodes

| # | Part | Package |
|---|---|---|
| D1/D2 | RR274EA-400 | Small |
| D3/D4 | RR274EA-400 | Small |
| D5/D6 | BAV99W | SOT323 |
| D7/D8 | BAV99W | SOT323 |
| D9/D10 | BAV99W | SOT323 |
| D11 | Bright LED (red) | discrete |
| Z1 | BZX84C33W | SOT323 |
| Z2 | BZX84C33W | SOT323 |
| Z3 | BZX84C5V6W | SOT323 |
| Z4 | BZX84C5V6W | SOT323 |
| Z5 | BZX84C15W | SOT23 |
| Z6 | BZX84C15W | SOT23 |
| Z7 | BZX84C4V7W | SOT323 |
| Z8 | BZX84C4V7W | SOT323 |

Transistors and Triacs

| # | Part | Package |
|---|---|---|
| Q1 | BC857BW | SOT323 |
| Q2 | BC847BW | SOT323 |
| Q3 | BC847BW | SOT323 |
| Q4 | BC857BW | SOT323 |
| Q5 | SI 1031R | small |
| Q6 | 2N7002W | SOT323 |
| Q7 | FMMT560 | SOT23 |
| Q8 | FMMT459 | SOT23 |
| T1 | Z0103 | D-pack |
| T2 | Z0103 | D-pack |

Integrated Circuits

| # | Part |
|---|---|
| U1 | PIC12F609 |
| U2 | PIC12F609 |

Surface Mount Capacitors

| # | Value | Size |
|---|---|---|
| C1 | 10 uF | 0603 |
| C2 | 0.47 uF | 0603 |
| C3 | 4.7 nF | 0603 |
| C4 | 2.2 uF | 0805 |
| C5 | 10 uF | 0603 |
| C6 | 4.7 uF | 1206 |
| C7 | 4.7 uF | 1206 |
| C8 | 33 nF | 0603 |
| C9 | 33 nF | 0603 |
| C10 | 1 nF | 0603 |

Varistors

| # | Size | Part # |
|---|---|---|
| V1 | 14 mm | M9SAS431KD14 |
| V2 | 7 mm | V275LA4P |
| V3 | 7 mm | V275LA4P |

The two resistors R8 and R12 are laser trimmed post assembly of the circuit to provide the desired triggering threshold for the sentinel unit. In this specific embodiment, R8 is laser trimmed to progressively increase the resistance of R8 until T2 turns ON with 4.5 mA of positive current. R12 is then laser trimmed until T1 turns ON with 4.5 mA of negative current. This sets the level of current flowing through those resistors that will trigger the respective triacs. This current is practically equivalent to the fault current in conductor 3. While the notional fault current threshold for circuit 101 is 5 mA, the 4.5 mA calibration is used to provide a margin for temperature variability of the triacs. For when circuit 101 is used in lower temperature environments, the triacs often require a slightly higher voltage—and hence a higher fault current—before triggering. Where circuit 101 is intended for deployment in more temperature stable applications, R8 and R12 are trimmed such that the respective triacs turn ON with more than 4.5 mA.

Circuit 101 provides a number of functions, which are categorized broadly as protection functions, on the one hand, and policing functions, on the other. The protection or monitoring functions are directed to sensing one or more external characteristics to circuit 101, and being responsive to those characteristics for selectively generating the fault signal. The policing or management functions are directed to sensing one or more internal characteristics to circuit 101, and being responsive to those internal characteristics for selectively generating the fault signal.

Circuit 101 is connected to the active and neutral conductors 5 and 6. As these conductors are downstream from the protection device they are both open to be switched between two states, one where they are connected to source 10, and the other where they are disconnected from source 10. Accordingly, these conductors 5 and 6 are referred to respectively as the switched active conductor and the switched neutral conductor or, for short, the switch active and the switched neutral respectively. It will be appreciated that terminals 7 and 8 are continually connected to the source—subject only to any upstream protection device triggering—via conductors 23 and 24, which are referred to simply as the active conductor and the neutral conductor respectively.

In circumstances where conductors 5 and 6 are disconnected from source 10, circuit 101 will not be powered and, hence, will not be operating. Upon connection of conductors 5 and 6 with source 10, circuit 101 will quickly power up—within a few milliseconds—and thereafter commence and continually perform the policing functions. Importantly, while there is a short delay in the policing functions being provided, circuit 101 will provide the required protection functions at all times, including during the transitory power-up phase.

Circuit 101 includes considerable symmetry and redundancy to contribute to a fast and reliable operation. This speed and reliability is relevant to both the policing functions and the protection functions and to the overall failsafe characteristics offered by circuit 101.

Turning to circuit 101, it will be appreciated that:

The label "Port" adjacent to the switched active in the bottom right-hand side of FIG. 2 corresponds to port 37 of FIG. 1.

The label "Port" adjacent to the switched neutral in the centre right-hand side of FIG. 2 corresponds to port 38 of FIG. 1.

The labels "Port" and the adjacent label "Sensor" in the top right-hand side of FIG. 2 correspond to port 36 and conductor 3 of FIG. 1.

The voltage on conductor 5—that is, the switched active—is applied to one side of R20 and, due to the operation of diodes Z6 and Z7 in combination, provide a ±15 V square wave voltage signal at the junction of R20 and Z6. This square wave is applied, via R21, to the base of transistors Q7 and Q8. In the positive and negative half-cycles of the square wave, Q8 and Q7 respectively are conductive and act (in combination with the associated components) to limit current in those half-cycles. The current that is limited is that current that flows from conductor 3, through the respective transistors Q8 and Q7, and to the switched neutral.

Due to the biasing of Q7 and Q8, any current flow in conductor 3 appears as a modified sine wave current through resistors R22 and R19. In this circuit, it is the sizing of R19 that provides critical value for determining the limited of the current in conductor 3. Accordingly, the resistance of R19 is selected to provide the desired maximum current at the likely maximum voltage to be experienced by the circuit in normal conditions. For a normal AC voltage of 240 V, R19 is selected with a value of 1.5 kOhm so that the maximum fault current—that is, the maximum current in conductor 3—is limited to 8 mA. In other embodiments using different current limits and/or different voltages, the resistance of R19 is selected accordingly.

The capacitor C4 is placed in parallel with R22 such that, during a fault condition, the sine wave current is shaped to both reduce the average current flowing through Q7 and Q8 and retain the peak current value. This has a number of advantages. Firstly, by reducing the average current through transistors Q7 and Q8 it is possible to use smaller and faster transistors. In the context of circuit 101, where all the components are contained on a single circuit board having a footprint of 1 inch×0.825 inch, the ability to use smaller transistors is significant. Second, the fault current—that is, the current flowing through conductor 3 and which personnel are exposed to—will also be limited to a 5 mA peak and a lower average current than a pure sine wave.

The capacitor C3 helps to reduce the impact of transient voltages. Typically, these voltages will only have a short duration and will not give rise to large current flows. However, these voltages are often a source of false triggering in prior art devices. For circuit 101, when a transient voltage appears on the switched active, R20 and C3 offer a relatively low impedance path for the resultant current to flow to the switched neutral. The higher the frequency of the transient current, the less impedance that will be offered by C3. If the high frequency voltage across C3 increases greatly, then Z5 and Z6 will also conduct to provide a further low impedance path for the transient current.

The capacitor C2 also acts to improve the performance of circuit 101 with transients. While C3 offers a low impedance path for the transient current to prevent it having an impact upon any fault current, C2 functions primarily to filter the current flowing internally within circuit 101—and in particular the current flowing through R7 and R9—to reduce the risk of false triggering of the triacs T1 and T2. This capacitor has the effect of shorting to the neutral any high frequency currents that exist on conductor 3 and which are, as a result, flowing though resistor R19.

The current that flows through R19 in the positive half-cycle will also flow through D9, Z7 and R7 and then to the switched neutral. In the negative half-cycle the current will instead flow through D10, Z8 and R9 and then to the switched neutral. If the magnitude of this current is greater than 4.5 mA, the voltage across R7, in the positive half-cycle, and R9, in the negative half-cycle, will be sufficient to trigger triacs T2 and T1 respectively. A triggering of either of these triacs will effective short the lower end of solenoid coil L1 to the switched neutral and cause the coil to become energized with the full mains voltage. This will result in the fault signal being generated.

As both the positive and negative half-cycles are independently monitored, the fault signal is able to be provided extremely quickly once a fault condition is sensed. It is enough that only one of triacs T1 and T2 is switched for the fault signal to be produced.

If the triggering of one of the triacs occurs very late in the half-cycle, it is possible that coil L1 will not be energized sufficiently to create the fault signal. But at that time the voltage on the switched active will be low and, hence, any personnel should be at low risk of an electric shock. As most faults occur in both half-cycles, even if a fault is not provided in the first half-cycle, it will in the subsequent half-cycle.

It has been found that circuit 101, in combination with MCB 17 provides an average switching time of less than 10 ms when in use with a 50 Hz 240 VAC supply source. It will be appreciated that a half-cycle for such a supply source is 10 ms. It has also been found that the time between a fault and the provision of a fault signal is no more than about half of the total switching time. That is, the switching time for unit 19 is less than 5 ms.

If one of the triacs T1 or T2 were to fail, a fault condition would still result in the other switching and, hence, a fault signal would still be generated. In this instance, it would be thought that the response time of circuit 101 and the subsequent triggering of MCB will take slightly longer. However, circuit 101 includes additional components to provide the testing and policing functions, and one of these functions is to regularly test triacs T1 and T2. If one of the triacs fails while a fault is present, circuit 101 operates to trigger the other triac during both half-cycles to compensate for the failed triac. Accordingly, the fault signal generates just as effectively. Additionally, if one triac fails the test and a fault condition is not present, circuit 101 directly generate a fault signal by triggering the other triac. These functions will be described in further detail below.

After assembly of circuit 101, and prior to deployment, a positive DC reference voltage is placed at the junction of C4 and R22 while R8 is laser trimmed until T2 triggers. Then, a negative DC reference voltage of the same magnitude is placed at the junction of C4 and R22 while R12 is laser trimmed until T1 triggers. The accuracy of the laser trimming is therefore tailored for the specific circuit and contributes to an extremely reliable and repeatable operation of the triacs and, hence, an extremely reliable and repeatable operation of circuit 101 in providing the fault signal.

Resistor R10 has a dual function, one of which is to enable a power supply to the microprocessor U1 and U2, and the other is to provide a timing signal to those microprocessors to indicate the zero crossing point of the voltage on the switched active.

R10 connects the switched active to the junction of the gates of Q5 and Q6. During the positive half-cycle, current will flow through R8 and then through two paths defined, on the one hand, by D8 and C1/R6, and on the other hand by Z4 and Z3. This combination provides a power supply to pin 1 ($V_{DD}$) of microprocessor U2. During the negative half-cycle, current will flow through R8 and then through two paths defined, on the one hand, by D7 and C5/R18, and on the other hand by Z4 and Z3. This combination provides a power supply to pin 8 ($V_{SS}$) of microprocessor U1.

The voltage at the junction of R10 and the gates of Q5 and Q6 switches those transistors to provide respective signals to pin 3 of U1 and pin 2 of U2. This signal provides U1 and U2 with an indication of the zero-crossing point of the voltage of the switched active. This timing indicator is used by the microprocessors, and will be described in more detail below.

The circuitry centred about diodes Z1 and Z2 is a power supply for providing a ±30 V power rails. These rails are used within circuit 101 primarily to assist with the policing functions and, particularly, to bias the internal transistor circuits so that the testing is able to occur. For example, It will be appreciated by those skilled in the art that when a triac, such as T1 or T2, is triggered or switched ON—that is, switched to a low-resistive state following the application of a voltage between the gate and the main terminal—the voltage drop across between the main terminals is relatively small. It will also be appreciated that once the current between the main terminals falls below a threshold—as will occur for a zero DC offset mains supply sine wave signal—the triac will turn OFF and there will be, effectively, on open circuit between the main terminals. These characteristics of a triac are used within circuit 101 to provide part of the policing function. Particularly, the biasing circuitry for the policing function includes transistors Q1, Q2, Q3 and Q4. Q1 and Q2 operate to bias the base and collector of transistor Q8, while Q3 and Q4 operate to bias the base and collector of Q7.

Microprocessors U1 and U2 use the zero-crossing signal—as supplied to pin 3 of U1 and pin 2 of U2—to respectively generate bias signals at pins 6 that are applied to the bases of Q4 and Q2 during the positive and negative half-cycles. The bias signals are not applied during every half-cycle, but only once every 2 or 3 seconds. These signals are timed to be late in the respective half-cycles in which they occur, and typically within the last millisecond of the half-cycle. With the bias applied to the relevant transistors, the microprocessors U1 and U2, late in the respective half-cycles, trigger respective triacs T1 and T1 by generating trigger signals at pin 7 of U1 and pin 3 of U2 which are then applied to the gates of T1 and T2. These trigger signals, while being sufficient to trigger the respective triacs, are timed for when the resultant current flow through coil L1 will be so small that L1 will not be energized and a fault signal will not be generated. Notwithstanding, the triggering of a triac will result in the junction of R1 and T1/T2 being connected to the active neutral, and hence, a voltage drop will appear at the gates of Q5 and Q6 which will be detected, via resistors R13 and R14 by U2 and U1 respectively. If the relevant triac does not trigger, the voltage drop will not appear at the gates of Q5 and Q6, and U2 and U1 will not detect any change.

If a triac is tested to be operating correctly, the microprocessor that conducted that test will communicate the positive result to the other microprocessor by a control sub-circuit formed by R15, R16, R17, R37, C10 and the microprocessors themselves. As successive successful test are communicated, microprocessor U1 pulses pin 2 with the result that D11 emits a periodic flash.

If, for example, triac T2 failed a test, microprocessor U2 would not provide a confirmation signal to U1. U2 would then progress to administer a further like test to T2 at the next scheduled time for such a test. If, after three such tests the result was still negative—in that U1 had still not received a confirmation signal via the control sub-circuit—then U2 will, via pin 3, provide a series of pulses spaced by 3 ms to ensure triac T2 is triggered and, if necessary, retriggered. (For the triac will turn OFF once the supply voltage passes into the next half cycle.) If triac T2 is operating normally it will provide a low impedance and solenoid L1 will quickly become energized. Simultaneously, U1 will switch T1 ON—through the application of a series of electrical pulses to the gate of T1 via C9. The result being that a fault signal is generated as at least T1 and likely T1 and T2 will be ON. During the period of the confirmatory testing—typically about ten seconds—but prior to the fault signal being generated, the rate of flashing of D11 will decrease. Once the fault signal has been generated, D11 will cease flashing, as circuit 101 will be isolated from the power source.

Solenoid L1 only requires about a quarter cycle of energisation to trigger MCB 17. In other embodiments, more sensitive solenoids are used to provide quicker switching times.

The microprocessors also monitor the timing of successive zero-crossing signals and, in an absence of such signals for more than three seconds, cause a fault signal to be generated.

Circuit 101 has many features that provide for failsafe operation. Some of these features go to internal monitoring, and others to the detection of the fault, and protection of the load circuit to prevent high fault currents even if circuit 101 fails to correctly function. For example:

- If either one of the microprocessors fails, there will be no communication between them confirming the successful testing of the triacs, and the other microprocessor will cause a fault signal to be generated within about ten seconds. In the intervening period, the functioning microprocessor will continue to provide protection to the load should a fault occur, as both triacs are able to be controlled to switch (by the relevant microprocessor) in both directions.
- If either one of triacs T1 and T2 fails, there will be an absence of full communication between the microprocessors to confirm the successful testing, and the microprocessor controlling the functioning triac will cause a fault signal to be generated within about ten seconds. In the intervening period, the functioning triac microprocessor will continue to provide protection to the load should a fault occur, as the remaining triac is able to be controlled to switch (by the relevant microprocessor) in both directions.
- In the event the solenoid coil L1 fails by going open circuit, a fault signal will generate, as the zero-crossing signal will disappear.
- In the event the solenoid coil L1 fails by shorting, circuit 101 will not be able to function to provide the fault signal and the MCB or other protection device will not move to isolate the load from the supply. However, during this time, circuit 101 continues to operate to limit any fault current—that is, the current in conductor 3—to less than 8 mA.
- Detection of a fault condition occurs quickly for monitoring occurs on both the positive and negative half-cycles.
- The reference for determining a fault condition is a floating conductor 3 that should be at a low potential relative to the switched neutral. The sentinel unit connects conductor 3 to the switched neutral and monitors any voltage between the two that gives rise to a current flow of about 5 mA. The use of a zero-reference—that is the voltage and current between conductor 3 and the switched neutral—allows circuit 101 to be fast acting and accurate.
- At power-up, the current limiting functionality of circuit 101 operates immediately should a fault be present.
- The microprocessors provide the policing function of circuit 101 and, should it be found that key components of circuit 101 are faulty or not correctly operating, a fault signal is provided.
- If both microprocessors fail, it is only the policing function that will cease. Circuit 101 will continue to monitor the load circuit and, in the event of a fault, will limit the fault current. (In the above embodiments, the fault current is limited to 8 mA).

Circuit 101 includes two high voltage protection circuits which are included on the circuit board with the other electrical components. A first of the high voltage protection circuits is defined by a 7 mm diameter varistor V2 that extends between the junction of solenoid L1 and triacs T1 and T2 to the switched neutral. Varistor V2 is primarily intended to protect triacs T1 and T2 from damage from high voltage surges.

The second high voltage protection circuit is defined by a 7 mm diameter varistor V3. This varistor is primarily intended to protect transistors Q7 and Q8 from high voltage surges, by diverting those surges to the switched neutral using R35 as a series protection resistor.

For low voltage applications, one or more of the high voltage protection circuits are omitted. In other embodiments, additional or alternative high voltage protection circuits are used. For example, in an embodiment, use is made of a further high voltage protection circuit such as circuit 110 that is illustrated in FIG. 5. It has been found that when use is made of the FIG. 5 protection circuit, in addition to the on-board protection circuits shown in FIG. 2, that circuit 101 is able to withstand voltage surges of up to 10 kV, administered as an over-voltage test in accordance with AS/NZS 3190-2002 RCD Standard.

The preferred embodiments described above provides for a protected IT EDS. The EDS is a true IT EDS, as an earth connection is not required. This is distinct from a prior art pseudo IT EDS which must include an earth connection or the protection system—typically including one or more RCDs—will not operate, and the prior art EDS will be unprotected.

The preferred embodiment described above also allows a plurality of separately protected load circuits to be supplied from a single isolation transformer. This allows, particularly for large installations, for a reduction in the quantum and cost of the associated infrastructure while increasing the protection available to property and personnel. This advantage, together with other advantages, is described in more detail in an Australian patent application in the name of the present applicant and filed with IP Australia on 19 Dec. 2008 (U.S. patent application Ser. No. 13/140,756).

A further advantage of the preferred embodiment described above is that the sentinel unit continually monitors the load circuit it is associated with and, upon detection of a fault, automatically actuates the associated protection device—which, in FIG. 1 is an MCB. That is, there is no requirement for manual monitoring or manual intervention to isolate the load circuit.

Figure 3:
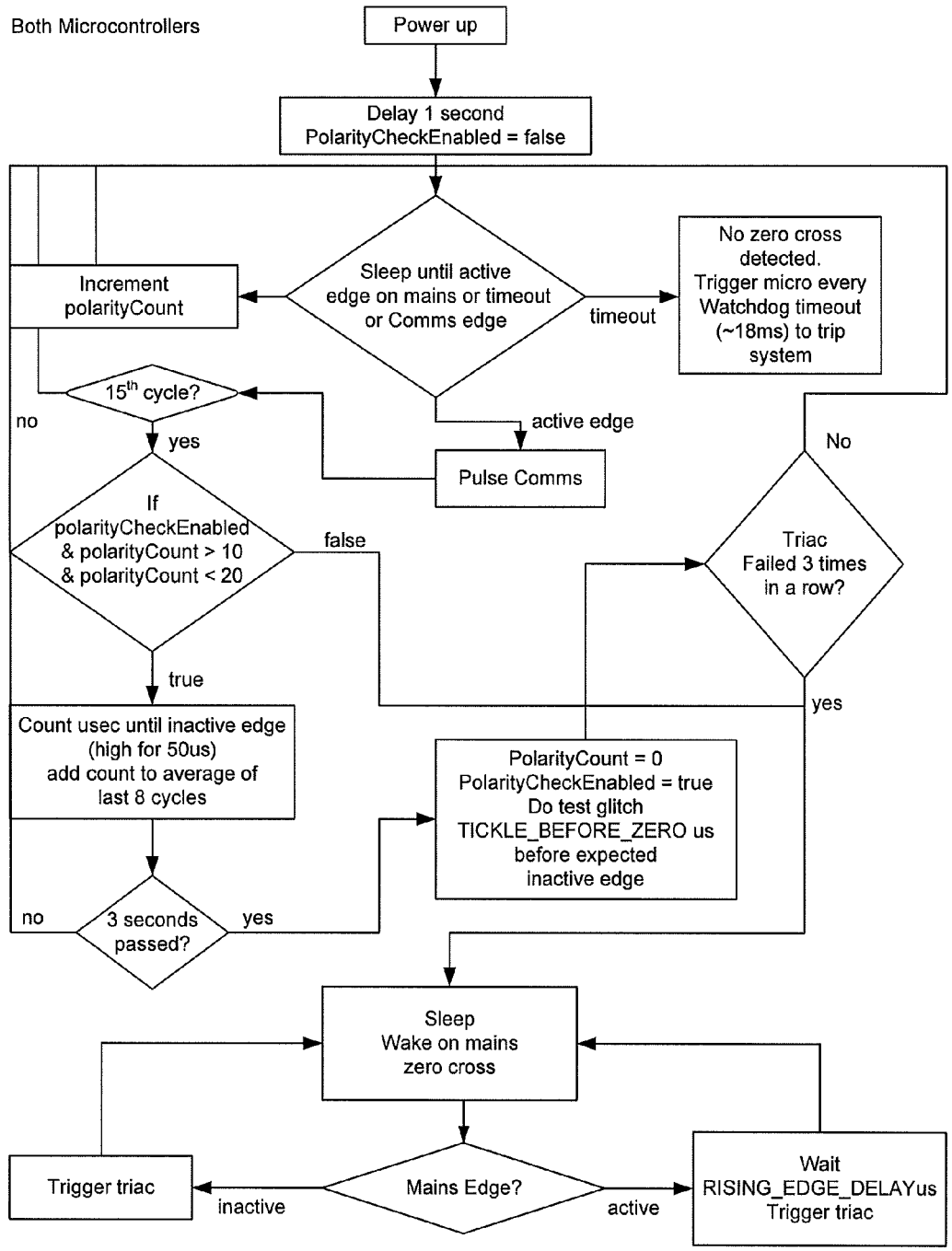
FIG. 3 is a flowchart providing an overview of the operation of the microprocessors included in the circuit of FIG. 2.

FIG. 3 is a flow chart illustrating, by way of example, the operation of the software used by processors U1 and U2.

FIG. 4 provides for unit 101 a comparison of certain characteristics with two prior art protection devices.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, for example, networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show single processors (having respective single memory that carries the computer-readable code, which is not shown) those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, for example, a computer program that is for execution on one or more processors, for example, one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, for example, a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (for example, a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (for example, a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; a carrier wave bearing a propagated signal detectable by at least one processor of the one or more processors and representing the set of instructions a propagated signal and representing the set of instructions; and a transmission medium in a network bearing a propagated signal detectable by at least one processor of the one or more processors and representing the set of instructions.

It will be understood that the steps of methods discussed are performed in one embodiment by an appropriate processor (or processors) of a processing (that is, computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term electrically connected, when used in the claims, should not be interpreted as being limited to direct connections only. The terms "connected" and "coupled", along with their derivatives, may be used. It should be understood that these terms are not intended as synonyms for each other. Thus, the scope of the expression a device A electrically connected to a device B should not be limited to devices or systems wherein an output of device A is directly electrically connected to an input of device B. It means that there exists an electrical path between an output of A and an input of B which may be a path including other devices or means. "Connected" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A sentinel unit for an IT electrical distribution system having a floating reference conductor and at least two electrical conductors for supplying electrical power from a source, via an electrical protection device, to a load, wherein: the protection device is responsive to a fault signal for electrically isolating the load from the source; and the sentinel unit selectively generates the fault signal in response to a high impedance low current fault indicated by the current in the reference conductor being greater than a predetermined current threshold, wherein the predetermined current threshold is less than about 10 mA.

2. A sentinel unit according to claim 1 wherein the predetermined current threshold is less than about 5 mA.

3. A sentinel unit according to claim 1 including a limiting circuit for limiting the current in the reference conductor.

4. A sentinel unit according to claim 3 wherein the limiting circuit limits the current in the reference conductor to no more than the predetermined current threshold.

5. A sentinel unit according to claim 1 that selectively generates the fault signal in response to the current in the reference conductor being greater than the predetermined current threshold and the voltage in the reference conductor being greater than a predetermined voltage threshold.

6. A sentinel unit according to claim 5 wherein the predetermined voltage threshold is less than about 40 Volts.

7. A sentinel unit according to claim 5 wherein the predetermined voltage threshold is less than about 35 Volts.

8. A sentinel unit according to claim 5 wherein the predetermined voltage threshold is less than about 30 Volts.

9. A sentinel unit according to claim 5 wherein the predetermined voltage threshold is less than a touch potential.

10. A sentinel unit for an IT electrical distribution system having a floating reference conductor and at least two electrical conductors for supplying electrical power from a source to a load, wherein the sentinel unit limits the current flowing in the reference conductor to less than a first predetermined current threshold, wherein the IT electrical distribution system supplies electrical power from the source, via an electrical protection device, to the load, and the protection device is responsive to a fault signal for electrically isolating the load from the source, and wherein the sentinel unit selectively generates the fault signal in response to a high impedance low current fault indicated by the current in the reference conductor being greater than a second predetermined current threshold of less than about 10 mA.

11. A sentinel unit according to claim 10 wherein the first predetermined current threshold and the second predetermined current threshold are different.

12. A sentinel unit according to claim 11 wherein the first and second predetermined current thresholds are less than about 35 mA.

13. A sentinel unit according to claim 12 wherein the first and second predetermined current thresholds are less than about 20 mA.

14. A sentinel unit according to claim 12 wherein the first and second predetermined current thresholds are less than about 10 mA.

15. A sentinel unit according to claim 12 wherein the first and second predetermined current thresholds are about 10 mA and 8 mA respectively.

16. A sentinel unit according to claim 12 wherein the first and second predetermined current thresholds are about 8 mA and 5 mA respectively.

17. A sentinel unit for an IT electrical distribution system having a floating reference conductor and at least two electrical conductors for supplying electrical power from a source to a load, wherein the sentinel unit includes:
   a monitoring circuit for selectively generating a fault signal in response to a high impedance low current fault indicated by a fault condition in the electrical distribution system, wherein the fault condition is a current in the reference conductor being greater than a predetermined current threshold of less than about 10 mA; and
   a policing circuit that is responsive to one or more characteristics of the monitoring circuit for selectively generating the fault signal.

* * * * *